No. 722,180. PATENTED MAR. 3, 1903.
E. U. KINSEY.
WATCH GLASS TRAY OR DRAWER.
APPLICATION FILED MAR. 26, 1901. RENEWED DEC. 30, 1902.
NO MODEL.
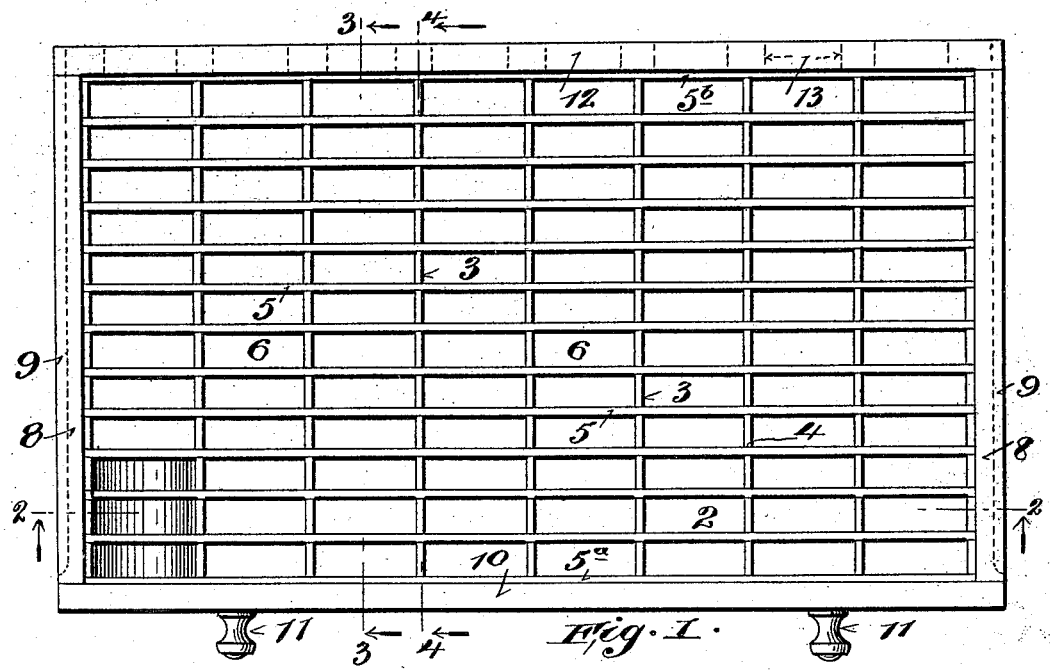
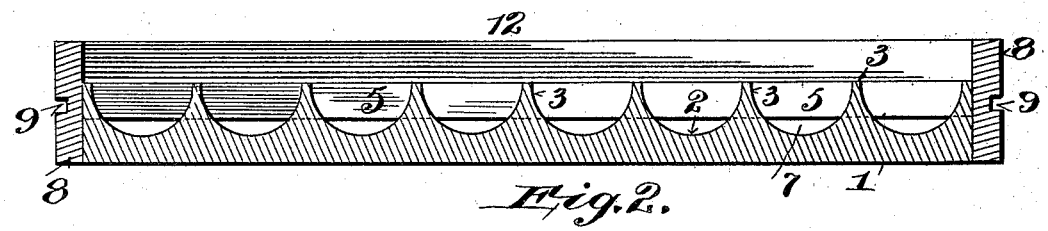
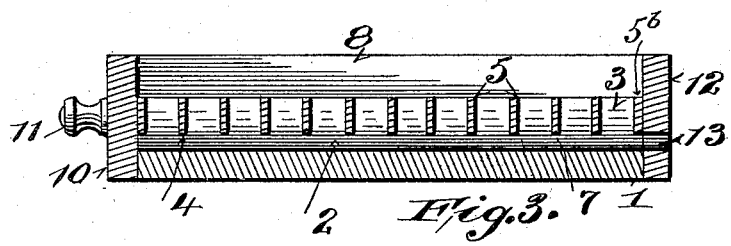
Witnesses:
C. W. Benjamin
Chas. G. Hensley
Inventor:
Ernest U. Kinsey
by Joseph L. Levy
atty

UNITED STATES PATENT OFFICE.

ERNEST U. KINSEY, OF NEW YORK, N. Y., ASSIGNOR TO JACOB W. RIGLANDER, LEOPOLD HAMMEL, AND MARK J. STRAUS, COMPOSING FIRM OF HAMMEL, RIGLANDER & COMPANY, OF NEW YORK, N. Y.

WATCH-GLASS TRAY OR DRAWER.

SPECIFICATION forming part of Letters Patent No. 722,180, dated March 3, 1903.

Application filed March 26, 1901. Renewed December 30, 1902. Serial No. 137,120. (No model.)

*To all whom it may concern:*

Be it known that I, ERNEST U. KINSEY, a citizen of the United States, and a resident of the city of New York, borough of Manhattan, county and State of New York, have invented certain new and useful Improvements in Watch-Glass Trays or Drawers, of which the following is a specification.

The object of my invention is to improve the construction of trays or drawers used for storing watch glasses or crystals.

It has been the prior practice to form a tray or drawer containing a considerable number of small compartments of the size to conveniently receive the watch glasses or crystals, there being a considerable number of such receptacles or divisions in each tray or drawer, and which division or series of divisions have been separately numbered or lettered to indicate the style, size, and number of the glass, the purpose of which is to permit the glasses to be taken from stock and readily placed in their proper division and to be withdrawn from the tray or drawer with the always present certainty that the proper glass as to style, size, &c., will be taken out. The maintenance of this certainty in both storing and removal is essential; otherwise confusion and loss of time and consequent extra cost in handling will result. Drawers or trays of this kind have been produced on the built-up method, wherein a foundation-board has been provided and lateral ribs or septums secured thereto to which have been or on which have been formed longitudinal projections, or sometimes "halves-in" slats have been used, thereby forming on the foundation-board the separate sections or divisions for the reception of the glasses. Additional short strips have been placed at the bottom of the transverse ribs to support the glasses or crystals off the bottom, (which are uniformly round or circular,) so as to permit them to be readily withdrawn and avoid their binding in the division. Another difficulty which has been present in structures of this kind arises from the settlement of dust or dirt in the separate divisions, and to remove this it has been necessary to remove the separate packages of glasses or crystals and the dust "dusted" or shaken out. This involves the removal of the glasses and their replacement.

The object of my invention is not only to produce a watch-glass tray or drawer much cheaper and simpler in construction, but which will avoid all of the before-mentioned disadvantages.

My invention therefore resides in the construction and combination of parts hereinafter described, and further pointed out in the claims.

In the drawings forming part of this specification, Figure 1 is a plan view of a tray or drawer made in accordance with an embodiment of my invention. Fig. 2 is a sectional elevation on the line 2 2, Fig. 1, looking in the direction of the arrow. Fig. 3 is a like view on the line 3 3, Fig. 1; and Fig. 4 is a like view on the line 4 4, Fig. 1.

Similar numerals of reference indicate like parts throughout the several views.

I have illustrated my invention in connection with a drawer which may form part of a cabinet containing one or more drawers; but it is obvious that it can be used simply as a tray.

In the illustrated embodiment of my invention I employ a single and preferably integral piece of wood or other suitable material as a foundation-board 1 and form in any well-known manner the transverse channels 2, preferably semicircular to conform to the curve of the glass or the packages of glasses, which latter are generally wrapped in thin paper, a number in a package, so that the package is substantially of the contour of the glasses. The channels are produced in the foundation-board at a certain predetermined distance apart, which leaves the upwardly-projecting septums 3. This produces in a very cheap and economical way a receptacle for the glasses disposed transversely of the board when said board is longer than it is wide. If the tray or drawer is otherwise proportioned, the grooves may be caused to run in the reverse direction. To provide separate compartments in the channels for the different packages of glasses, the ribs or septums 3 are grooved transversely of their length, as at 4, into which are let slats 5, which together with the septums 3 form compartments 6, having a circular bottom. These slats may either be fastened in place or loosely laid in the cross-grooves 4, whereby an enlargement of the compartments or divisions can be readily had to accommodate a greater or lesser number of glasses in each compartment. The cross-grooves which receive the longitudinal slats may extend down to the bottom of the channels, if desired; but I prefer that they end at a distance above, as in Figs. 2, 3, so as to provide a space 7 between the bottom of the slats and the trough for the passage of dust, &c., which may gather in the tray or drawer.

When the tray is to be used as a drawer, it is only necessary to secure to the sides of the board the side pieces 8, properly grooved, 9, to receive the tenons in the frame of a cabinet, a front piece 10, provided with drawer-pulls or the like 11, and a rear piece 12, thus completely incasing the tray, the foundation-board 1 of which forms the bottom of the drawer. When so used, I prefer that the front and rear boards 10 12 of the drawer shall constitute an abutment against which one side of the extreme front and rear slats $5^a$ $5^b$ shall impinge, said rear and front boards forming one side of the respective grooves into which said slats are let, and in which event the rear board will be provided with apertures 13, alining with the bottom of the channels 2. When used as a tray, the front and rear slats, as well as the foundation-board, may finish off those edges or may be provided with additional boards. The front and rear boards in this case will have apertures alining with the space beneath the slats and with the bottom of the groove. As thus constructed it will only be necessary to slightly tilt the drawer and shake it to cause dust, &c., which may accumulate at the bottom of the channels to pass out of the apertures at the rear.

Of course it is manifest that the base-board may be of any size and have any number of channels and consequent septums 3 and that instead of using one piece of wood or other desired material to form the base-board it can be made of any number of pieces of wood joined together or otherwise united to form a unitary structure.

I claim—

1. In an article of the class described, the combination with the base-board, the septums 3, the slats extending between the septums to form compartments, and a channel below the slots communicating with each compartment, substantially as described.

2. The combination with the base-board having channels, intervening septums, lateral grooves formed through the septums above the bottom of the channels, and the slats in said grooves lying above the bottom of said channels.

3. The combination with the base-board, the channels and intervening septums, the slats extending between said septums, a passage under the slats in said channel, the end board, and an aperture in the end board alining with said channel.

Signed in the city, county, and State of New York this 25th day of March, 1901.

ERNEST U. KINSEY.

Witnesses:
CHAS. G. HENSLEY,
SOPHIE SEKOSKY.